US006988947B2

(12) United States Patent
Baerlocher et al.

(10) Patent No.: US 6,988,947 B2
(45) Date of Patent: *Jan. 24, 2006

(54) GAMING DEVICE WITH BONUS SCHEME HAVING MULTIPLE SYMBOL MOVEMENT AND ASSOCIATED AWARDS

(75) Inventors: Anthony J. Baerlocher, Reno, NV (US); Jean Brossard Venneman, Reno, NV (US); Christopher T. Brune, Holly Springs, NC (US)

(73) Assignee: IGT, Reno, NV (US)

( * ) Notice: Subject to any disclaimer, the term of this patent is extended or adjusted under 35 U.S.C. 154(b) by 434 days.

This patent is subject to a terminal disclaimer.

(21) Appl. No.: 09/919,022

(22) Filed: Jul. 31, 2001

(65) Prior Publication Data

US 2002/0016200 A1 Feb. 7, 2002

Related U.S. Application Data

(60) Provisional application No. 60/222,159, filed on Aug. 1, 2000.

(51) Int. Cl.
*G07F 17/32* (2006.01)
*A63F 13/00* (2006.01)

(52) U.S. Cl. .......................................... 463/20; 463/16

(58) Field of Classification Search .................... 463/1, 463/16, 20, 22, 25; 273/143 R, 134.1, 138.2, 273/138
See application file for complete search history.

(56) References Cited

U.S. PATENT DOCUMENTS

| | | | | |
|---|---|---|---|---|
| 5,547,201 | A * | 8/1996 | Honeywill | 463/9 |
| 5,997,400 | A | 12/1999 | Seelig et al. | |
| 6,015,346 | A | 1/2000 | Bennett | |
| 6,019,369 | A | 2/2000 | Nakagawa et al. | |
| 6,033,307 | A * | 3/2000 | Vancura | 463/20 |
| 6,059,289 | A | 5/2000 | Vancura | |
| 6,089,977 | A | 7/2000 | Bennett | |
| 6,102,798 | A | 8/2000 | Bennett | |
| 6,159,098 | A | 12/2000 | Slomiany et al. | |
| 6,176,487 | B1 * | 1/2001 | Eklund et al. | 273/249 |
| 6,190,255 | B1 | 2/2001 | Thomas et al. | |
| 6,210,279 | B1 | 4/2001 | Dickinson | |
| 6,290,600 | B1 * | 9/2001 | Glasson | 463/20 |
| 6,494,785 | B1 * | 12/2002 | Gerrard et al. | 463/20 |
| 6,517,432 | B1 * | 2/2003 | Jaffe | 463/16 |
| 6,520,855 | B2 * | 2/2003 | DeMar et al. | 463/20 |
| 6,602,136 | B1 * | 8/2003 | Baerlocher et al. | 463/16 |

FOREIGN PATENT DOCUMENTS

EP 0 945 837 A2 9/1999

(Continued)

OTHER PUBLICATIONS

Big Bank Piggy Banking Brouchures by WMS Gaming, Inc., publishing dated unknown.

(Continued)

*Primary Examiner*—Jessica J. Harrison
(74) *Attorney, Agent, or Firm*—Bell, Boyd & Lloyd LLC

(57) ABSTRACT

The present invention relates to a bonus scheme for a gaming device which involves a terminating symbol moving with respect to a player symbol. The game causes both symbols to visit new locations along a path. The game successively moves each symbol a certain number of locations. As the symbols advance, the player gains various awards and bonus values associated with the locations visited by the player symbol. The bonus round terminates when the terminating symbol catches the player symbol. This type of bonus scheme incorporates a chase or pursuit concept and increases player excitement and joy.

49 Claims, 12 Drawing Sheets

FOREIGN PATENT DOCUMENTS

| | | |
|---|---|---|
| WO | WO 97/32285 | 4/1997 |
| WO | WO 00/12186 | 3/2000 |

OTHER PUBLICATIONS

Winning Streak Web Site Printout by WMS Gaming, Inc., printed Mar. 21, 2001.

Jackpot Party Brouchures and Articles by WMS Gaming, Inc., published 1998, 1999, 2000.

Elvis Advertisement by IGT, published in 1999.

Run For Your Money Brochure by IGT, published in 1998.

Slotopoly Brochure by IGT, published in 1998.

Adders & Ladders Brochure by Barcrest, published dated unknown.

Description of "ROAD HOG" Gaming Device and Advertisement by Barcrest, published date unknown.

Run For Your Money by Barcrest, published date unknown.

Spiker the Biker by Barcrest, published date unknown.

Easy Street Article (Casino Data Systems) by Strictly Slots published 2000.

Andy Capp Game Description written by Bally Gaming Systems, published in 2001.

Andy Capp Article written by Strictly Slots published in Feb. 2002.

Bally Live! Special Global Gaming Expo 2002 Issue written by Bally Gaming Systems, published in Fall 2002.

Easy Street Advertisements, printed on Jan. 15, 2001.

Pink Panther Advertisement and Article, written by International Game Technology, published in 2000.

* cited by examiner

84

GAMING DEVICE WITH BONUS SCHEME HAVING MULTIPLE SYMBOL MOVEMENT AND ASSOCIATED AWARDS

PRIORITY CLAIM

This application claims priority upon U.S. Provisional Patent Application, Ser. No. 60/222,159, filed on Aug. 1, 2000, entitled "Gaming Device With Bonus Scheme Having Multiple Symbol Movement and Associated Awards."

CROSS-REFERENCE TO RELATED APPLICATIONS

This application is related to the following co-pending commonly owned patent applications: "GAMING DEVICE WITH BONUS SCHEME PROVIDING AWARDS ASSOCIATED WITH MOVEMENTS ALONG A PATH," Ser. No. 09/583,429, "GAMING DEVICE HAVING A DESTINATION PURSUIT BONUS SCHEME WITH ADVANCE AND SETBACK CONDITIONS," Ser. No. 09/686,409, and "GAMING DEVICE WITH A BONUS SCHEME INVOLVING MOVEMENT ALONG PATHS WITH PATH CHANGE CONDITIONS," Ser. No. 09/686,538.

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device with a bonus scheme wherein a player receives various awards associated with the movement of multiple symbols along a path.

BACKGROUND OF THE INVENTION

Video games which involve one character or symbol chasing another character or symbol on a path or grid are well known. One character or symbol represents the player, and the other character or symbol represents an opponent. The player symbol is usually initially positioned ahead of the opponent symbol. The player's goal is to advance along the path without being caught by the opponent. Typically, as the player advances, the player receives various points. When the opponent symbol catches the player symbol, one of several events may occur, depending upon the type of game. For example, the game may terminate, the player may lose a life or the player may lose points. If the opponent symbol causes the game to terminate, the opponent symbol may be viewed as a terminating symbol.

Terminating symbols are found in contemporary gaming devices such as slot machines which include a primary game and a bonus round. After a player achieves a certain level of success in the primary game, these games award players with an opportunity to gain bonus values in a bonus round. Some current bonus schemes enable a player to choose from a group of symbols. Often, one or more of the symbols are terminating symbols. In existing gaming device bonus schemes, the location of the terminating symbols does not vary from the beginning of the bonus round to the end of the bonus round. This is because the terminating symbols do not move during the bonus round. European Patent Application No. EP 0 945 837 A2 filed on Mar. 18, 1999 and assigned on its face to WMS Gaming, Inc. discloses a bonus scheme generally of this type.

To increase player enjoyment and excitement, it is desirable to provide slot machine players with bonus schemes which involve the movement of terminating symbols. In particular it is desirable to incorporate into a bonus scheme, the movement of a player symbol and a terminating symbol in a chase game. As players wait to see when their symbol will be caught while obtaining awards during the pursuit, players feel a heightened experience of anticipation and excitement.

SUMMARY OF THE INVENTION

The present invention overcomes the above shortcomings by providing a gaming device and method which provides players with various awards for advancing a player symbol along a path without being caught by a terminating symbol. The symbols are representations in visual, audio or audio-visual form. The path is a route which is preferably functionally cyclical, even though the path may be displayed in linear form. The path can also be non-cyclical.

At the beginning of the bonus round, a player symbol is exhibited at a starting location, and a terminating symbol is exhibited at another location. The player symbol and terminating symbol preferably advance in the same direction, whether clockwise, counterclockwise forward, backward, upward or downward. The particular locations which the symbols visit during a bonus round can be predetermined and programmed in the computer of the gaming device. Alternatively, the particular locations which the symbols visit can be randomly generated by the computer during the bonus round.

Regardless of how the game determines the new locations, the game preferably simulates a random number generator such as a spinning reel or wheel to increase player excitement and enjoyment. Upon the use of a play activator or upon automatic successive intervals, the computer displays a number of moves for each symbol. Then the computer causes the symbols to visit locations according to the number of moves displayed.

Some, if not all of the locations are associated with bonus values. It should be appreciated that a location can be a bonus value in and of itself. The bonus values preferably vary from location to location. For example, one location may be associated with a relatively high bonus value, and another location may be associated with a relatively low bonus value or no bonus value at all. When the player symbol visits a location, the game awards the player with the bonus value associated with that location. The game may also award bonus values upon the occurrence of other events discussed below.

The bonus round terminates when the terminating symbol catches the player symbol. The term "catch" as used herein means: (i) to visit a location which is also being visited by another symbol; or (ii) to visit a location in front of or beyond another symbol. Once the bonus round terminates, the game awards any accumulated bonus values and credits to the player.

Preferably, the game displays: (a) the number of moves provided for the player symbol and the terminating symbol; (b) a running total of the bonus values accumulated by the player; and (c) the number of the lap which the player symbol is taking through the path.

In a first embodiment of the present invention, preferably the player initially uses a play activator such as a play, action or move button or indicator to make the computer of the gaming device cause visits. After using the play activator once, the computer automatically causes the player symbol and terminating symbol to visit new locations in successive intervals. It should be appreciated that the computer could automatically cause visits when a bonus round is triggered without the player's input. In any event, this automated process continues until the bonus round terminates.

With each interval, the player symbol and the terminating symbol each visit a new location. Each time the player symbol visits or stops on a location, the game awards the player with a bonus value associated with that location, if any. Preferably, the game also awards the player for each lap which the player symbol completes without being caught. When the terminating symbol catches the player symbol, the bonus round terminates and the game awards the player with any gained bonus values and bonus credits.

Similar to the first embodiment, in a second embodiment of the present invention by repeatedly using a play activator, the player makes the computer of the gaming device cause visits. Preferably, the particular locations which the symbols visit are randomly generated by the computer during the bonus round based upon a predetermined formula.

Each time the player symbol visits a new location, the game awards the player with a bonus value associated with that location, if any. In addition, the game awards the player with bonus values when: (a) the player symbol completes a lap without being caught by the terminating symbol; and (b) the player symbol moves so much more than the terminating symbol that the player symbol ends up catching the terminating symbol. Also, whenever the player symbol visits its starting location, the game may award the player symbol with a visit to a new location.

The bonus round of the second embodiment can terminate in one of three manners: (a) if the player symbol has made a predetermined number of laps without being caught by the terminating symbol; (b) if the terminating symbol does in fact catch the player symbol; and (c) if the player symbol catches the terminating symbol. After the bonus round terminates, the game awards the player with any gained bonus values and corresponding bonus credits.

It is therefore an object of the present invention to provide a gaming device with a bonus scheme having multiple symbol movement and which provides a player with various awards associated with the symbol movement.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1:
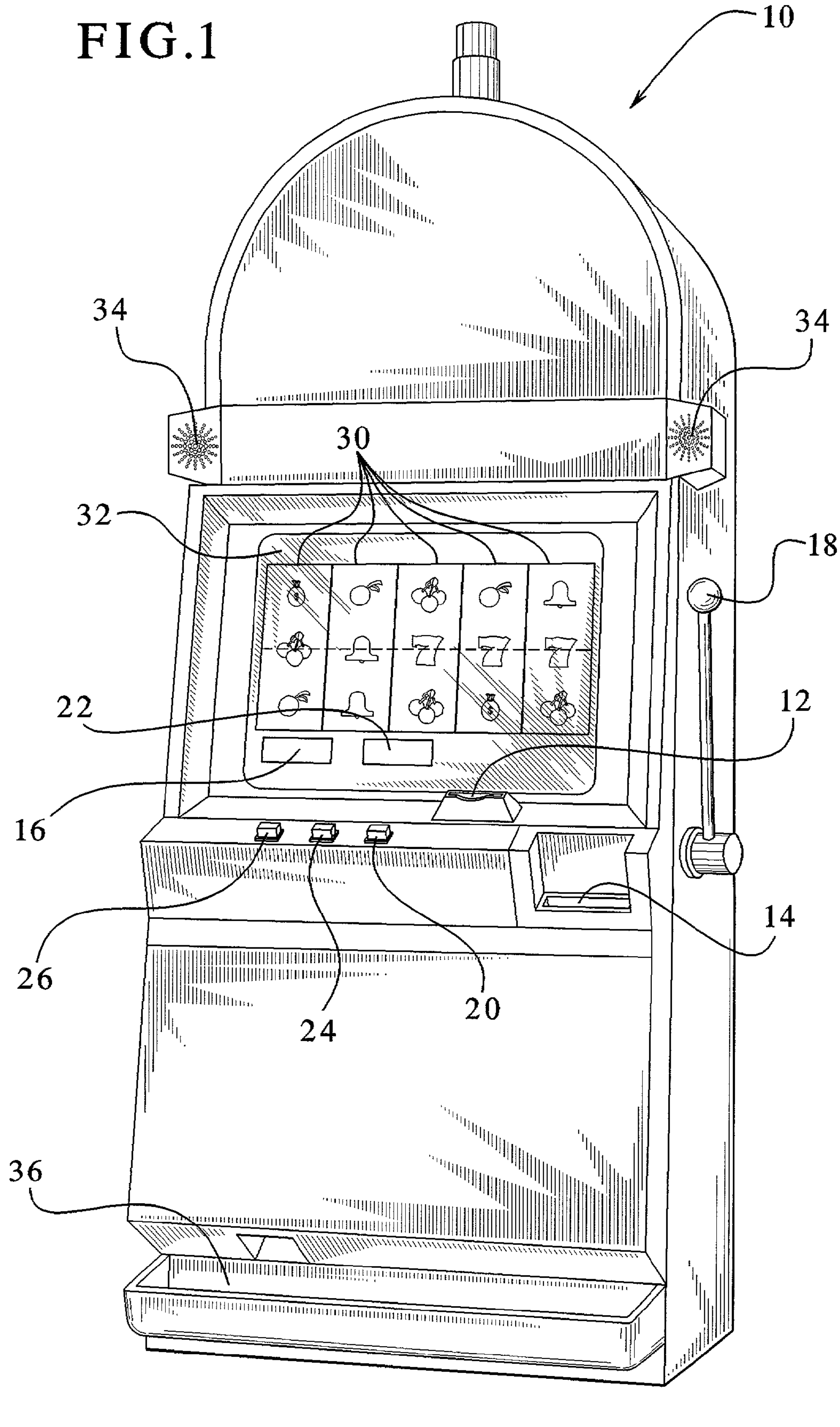
FIG. 1 is a perspective view of one embodiment of the gaming device of the present invention.

Referring now to the drawings, FIG. 1 generally illustrates a gaming device 10 of one embodiment of the present invention, which is preferably a slot machine having the controls, displays and features of a conventional slot machine. Gaming device 10 is constructed so that a player can operate gaming device 10 while standing or sitting. However, it should be appreciated that gaming device 10 can be constructed as a pub-style table-top game (not shown) which a player can operate preferably while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any game such as slot, poker or keno in addition to any of their bonus triggering events which trigger the bonus scheme of the present invention. The symbols and indicia used on and in gaming device 10 may be in mechanical, electrical or video form.

As illustrated in FIG. 1, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

Gaming device 10 also has a display window 28 which contains a plurality of reels 30, preferably three to five reels in mechanical or video form. Each reel 30 displays a plurality of indicia such as bells, hearts, fruits, numbers, letters, bars or other images which preferably correspond to a theme associated with the gaming device 10. If the reels 30 are in video form, the gaming device 10 preferably displays the video reels 30 at video monitor 32 instead of at display window 28. Furthermore, gaming device 10 preferably includes speakers 34 for making sounds or playing music.

At any time during the game, a player may "cash out" and thereby receive a number of coins corresponding to the number of remaining credits by pushing a cash out button 26. When the player "cashes out," the player receives the coins in a coin payout tray 36. The gaming device 10 may employ other payout mechanisms such as credit slips redeemable by a cashier or electronically recordable cards which keep track of the player's credits.

Figure 2:
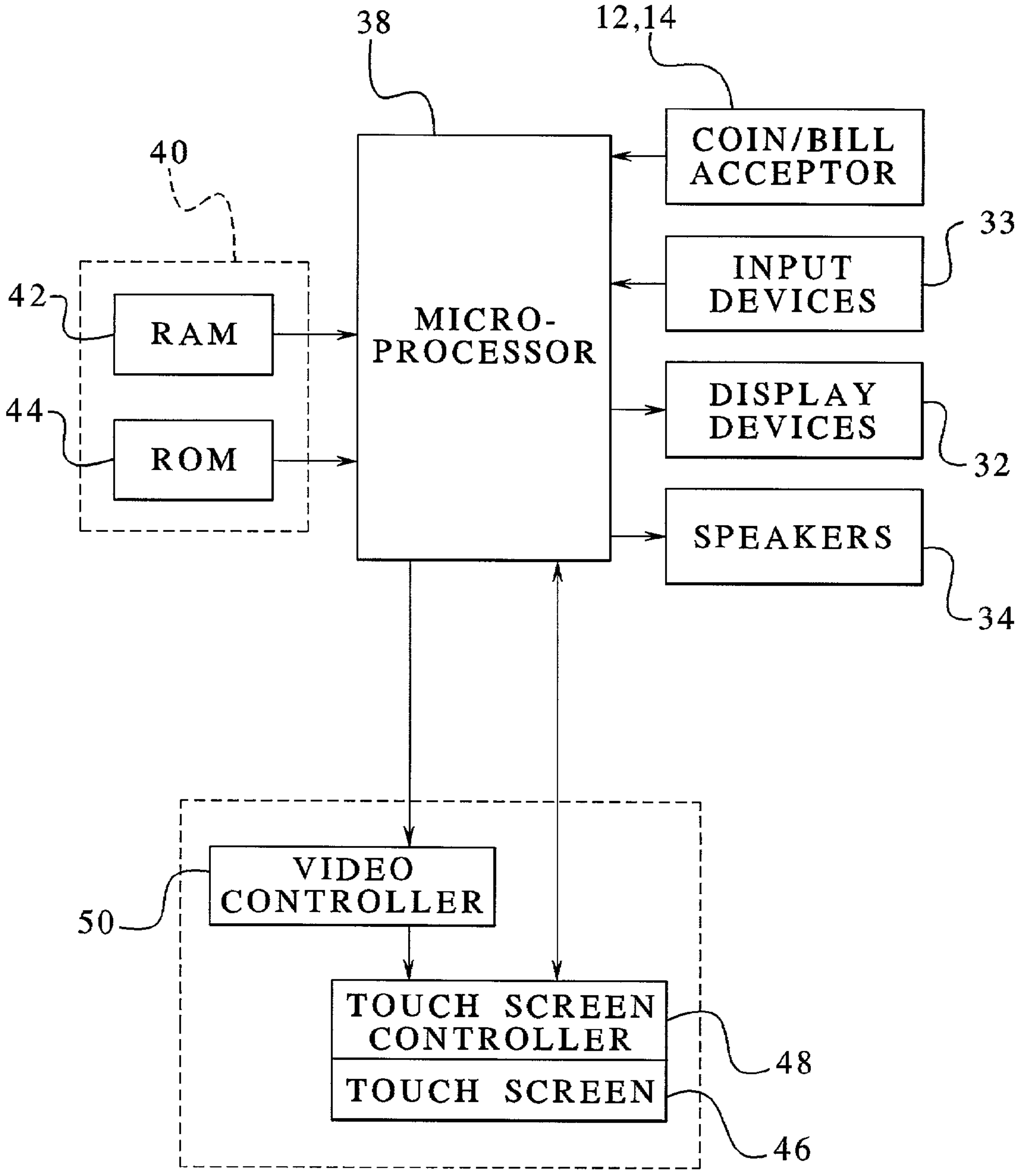
FIG. 2 is a schematic block diagram of the electronic configuration of one embodiment of the gaming device of the present invention.

With respect to electronics, gaming device 10 preferably includes the electronic configuration generally illustrated in FIG. 2, including a processor 38, a memory device 40 for storing program code or other data, a video monitor 32 or other display device (i.e., a liquid crystal display) and at least one input device such as play buttons 20. The processor 38 is preferably a microprocessor or microcontroller-based platform which is capable of displaying images, symbols and other indicia such as images of people, characters, places, things and faces of cards. The memory device 40 can include random access memory (RAM) 42 for storing event data or other data generated or used during a particular game. The memory device 40 can also include read only memory (ROM) 44 for storing program code which controls the gaming device 10 so that it plays a particular game in accordance with applicable game rules and pay tables.

As illustrated in FIG. 2, the player preferably uses play buttons 20 to input signals into gaming device 10. Furthermore, it is preferable that touch screen 46 and an associated touch screen controller 48 are used instead of a conventional video monitor 32. Touch screen 46 and touch screen controller 48 are connected to a video controller 50 and processor 38. A player can make decisions and input signals into the gaming device 10 by touching touch screen 46 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 are generally referred to herein as the "computer."

With reference to FIGS. 1 and 2, to operate the gaming device 10, the player must insert the appropriate amount of money or tokens at coin slot 12 or bill acceptor 14 and then pull the arm 18 or push the play button 20. The reels 30 will then begin to spin. Eventually, the reels 30 will come to a stop. As long as the player has credits remaining, the player can spin the reels 30 again. Depending upon where the reels 30 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on the display window 28. The gaming device 10 also includes a display device such as a video monitor 32 shown in FIG. 1 enabling the player to play the bonus round. Preferably, the qualifying condition is a predetermined combination of indicia appearing on a plurality of reels 30. As illustrated in the three reel slot game shown in FIG. 1, the qualifying condition could be the text "BONUS!" appearing in the same location on three adjacent reels.

Bonus Scheme

If a player achieves a bonus triggering or qualifying condition while playing the game, the gaming device 10 automatically displays a screen for the bonus round of the present invention. Preferably this screen is displayed on a liquid crystal display device. As indicated by block 52 in FIG. 3 and as shown in FIG. 4, the bonus round of the present invention begins by displaying a path 54, a plurality of locations 56 along the path 54, player symbol 58 and terminating symbol 60.

Figure 4:
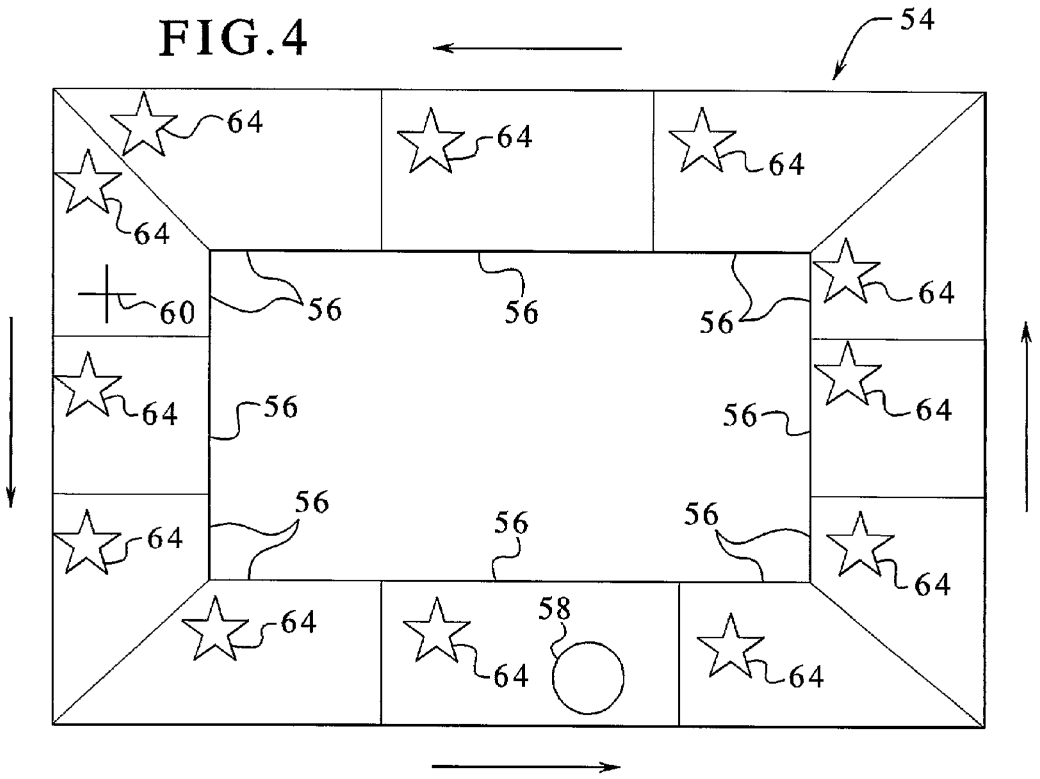
FIG. 4 is a top plan view of one path of one embodiment of the present invention.
Figure 5:
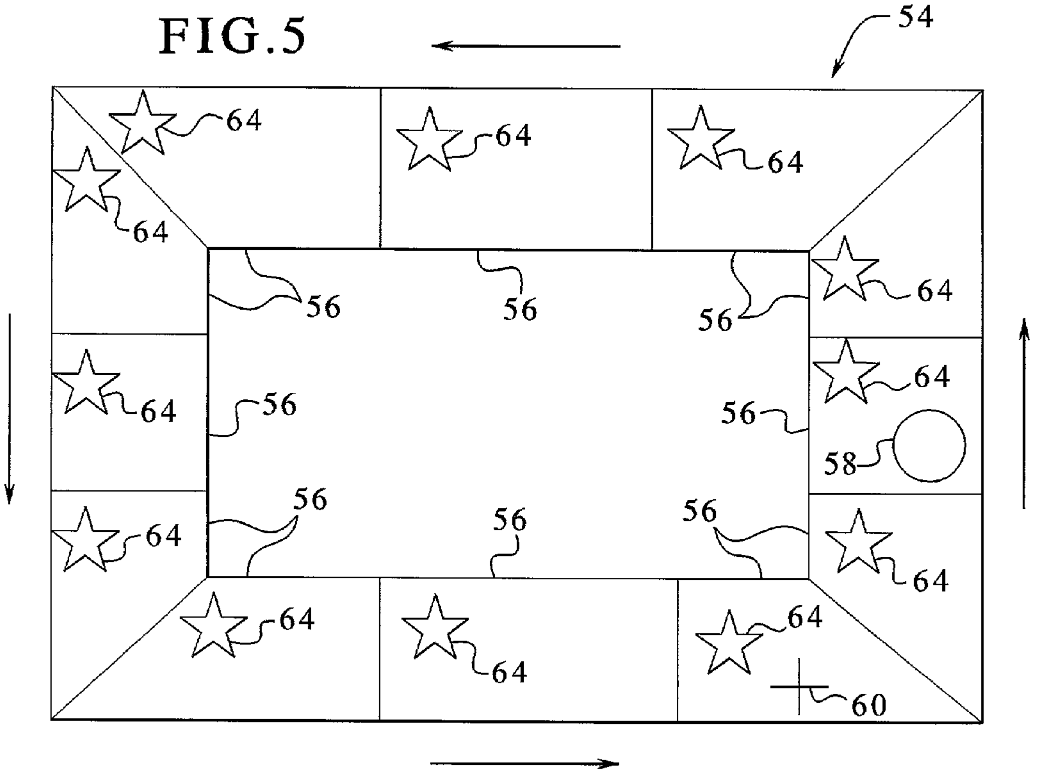
FIG. 5 is a top plan view of one path of one embodiment of the present invention.
Figure 6:
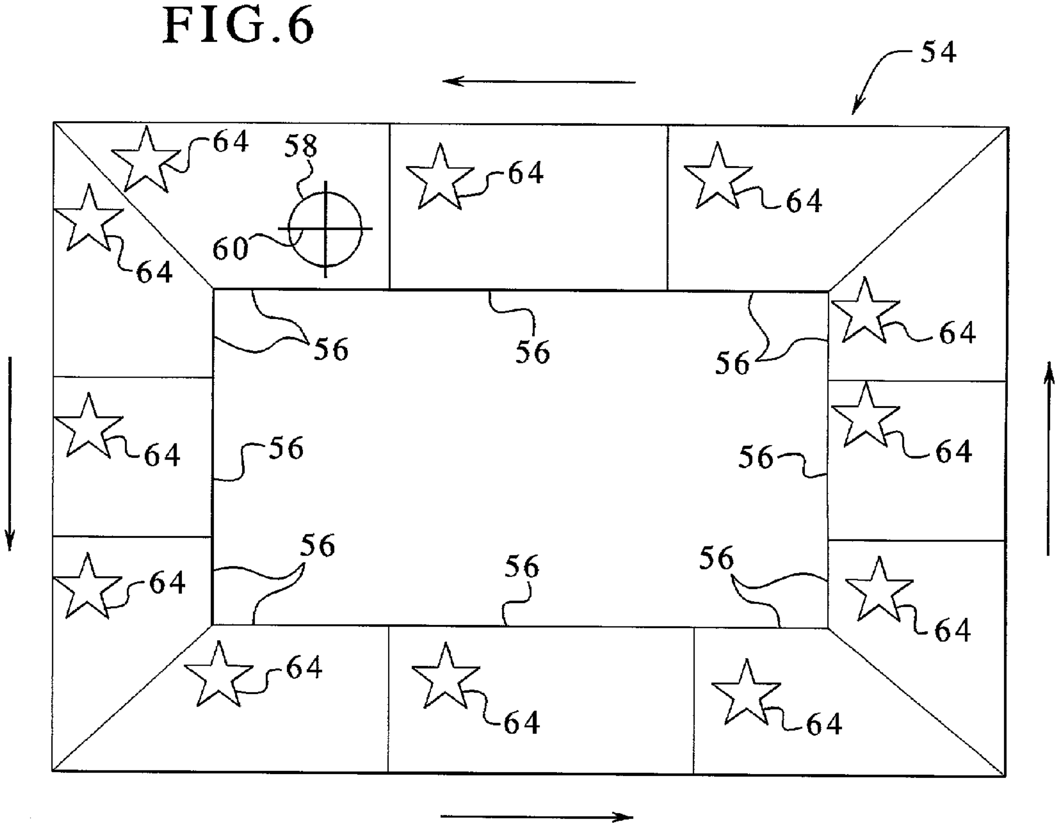
FIG. 6 is a top plan view of one path of one embodiment of the present invention.
Figure 7:
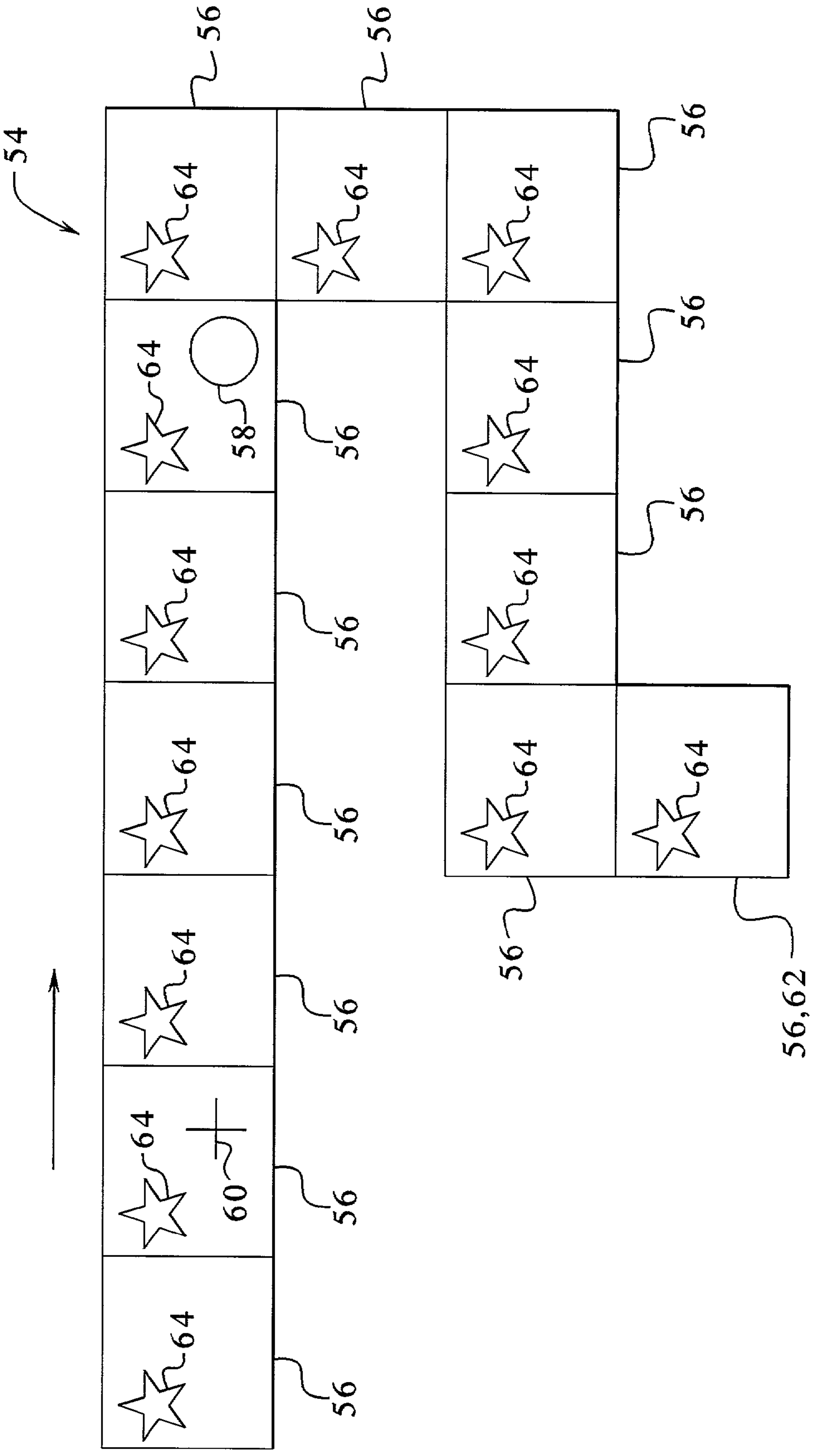
FIG. 7 is a top plan view of one path of the first embodiment of the present invention.

Path 54 preferably is a functionally cyclical route having a series of individual locations 56 for a player symbol 58 and terminating symbol 60, as illustrated in FIGS. 4 through 6. The path 54 has a shape, such as a circle, straight line, curve, polygon or any variation thereof. The symbols move incrementally along path 54 from location to location. It should be appreciated that path 54 may be linear, and the game could cause the player symbol 58 to repeat parts or all of the path 54 (i.e., send the player symbol 58 back through path 54). Also, as illustrated in FIG. 7, it should be appreciated that path 54 can be linear and have a definite end point 62.

Locations 56, which are identified in FIGS. 4 through 7, are separate positions or areas which can be landed on or visited by a symbol. Locations 56 can be of any size, shape or color, exhibiting any message 64. Messages 64, illustrated as stars in FIGS. 4 through 7, can be any information provided to a player in audio, visual or audio-visual form, such as numerals, pictures, drawings, sounds or songs. For example, messages 64 could inform the player that visiting a particular location will award a bonus value which is double the standard amount or that visiting a particular location will automatically cause a player symbol 58 or terminating symbol 60 to visit a particular location 56. Preferably, messages 64 are visual, numeric bonus values which vary from location to location. Alternatively, such messages could be masked until a symbol visits a location 56.

Player symbol 58 and terminating symbol 60 are predetermined images, sounds, or activities. The characteristics of player symbol 58 and terminating symbol 60 are such that a player can distinguish the two symbols from one another. For example, player symbol 58 could be an audio-visual representation of a meowing cat, and terminating symbol 60 could be an audio-visual representation of a barking dog. Player symbol 58 is illustrated in FIGS. 4 through 7 as a circle, and terminating symbol 60 is illustrated in FIGS. 4 through 7 as a plus sign. When a player symbol 58 or terminating symbol 60 is described herein as visiting a location 56, this means that the game exhibits the symbol at a particular location 56.

The gaming device computer determines the outcome as to which location a symbol will visit. This outcome can be predetermined and programmed into the computer. Alternatively, the computer can randomly generate this outcome or generate the outcome based on predetermined probabilities during the bonus round, preferably immediately after the player uses a play activator.

In either case, preferably the game simulates a random number generator technique or a spinning reel or wheel. The purpose is to make the player feel that the game is randomly generating a number of moves for the symbols. Furthermore, it is preferable that the present invention includes only one player symbol 58 and one terminating symbol 60, and that each symbol can only visit one location 56 at a time.

At the beginning of the bonus round, the computer exhibits a player symbol 58 at a particular location 56 on the path 54. The computer also exhibits a terminating symbol 60 at another location 56, preferably behind the player symbol 58. At the beginning of the example bonus round illustrated in FIG. 4, terminating symbol 60 is initially exhibited four locations behind player symbol 58.

Figure 3:
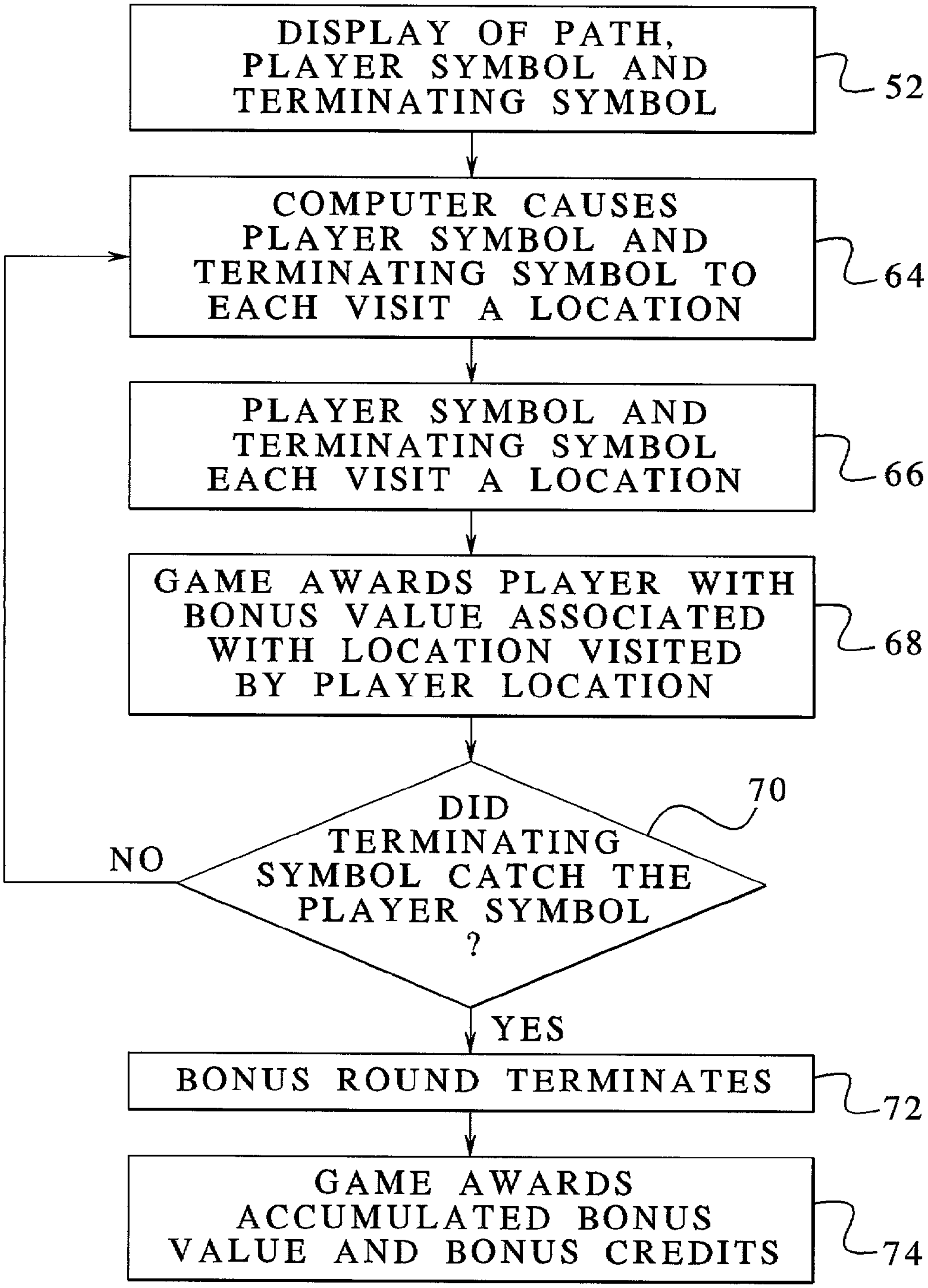
FIG. 3 is a flow diagram of one embodiment of the bonus scheme of the present invention.

In reference to FIG. 3, after the game displays path 54 and the symbols, the computer causes the symbols to visit new locations, as indicated by block 64. The computer can be programmed to successively cause such visits or instead the computer can rely upon a player's input from a play activator. Next as indicated by block 66, player symbol 58 visits a particular location in front of its location, and terminating symbol 60 visits a particular location in front of its location. Preferably, the symbols move in the same direction, whether clockwise, counterclockwise, forward, backward, upward or downward. However, it should be appreciated that the symbols can move in opposite directions at times.

As shown in the example bonus round in FIG. 5, the computer caused player symbol 58 to visit a location which was three locations ahead of its starting location. The computer also caused terminating symbol 60 to visit a location which was five locations ahead of its starting location. The game would then award the player with any bonus value associated with the new location visited by player symbol 58, as indicated by block 68. If the terminating symbol 60 does not catch player symbol 58, the computer causes the symbols to make additional visits, as indicated by diamond 70.

In the example bonus round, the terminating symbol 60 did not catch the player symbol 58 when the computer first caused the symbols to visit new locations. However, when the computer caused the symbols to visit new locations for a second time, terminating symbol 60 did catch player symbol 58, as illustrated in FIG. 6. If at any time terminating symbol 60 does catch player symbol 58, the bonus round terminates, as indicated by block 72 in FIG. 4. As indicated by block 74 in FIG. 4, after the bonus round terminates, the game awards the player with any bonus values and bonus credits earned in the bonus round.

Preferably, the bonus scheme of the present invention displays: (a) the number of moves which the player symbol 58 and terminating symbol 60 will take; (b) a running total of bonus values accumulated by a player; and (c) the number of the lap which the player is taking through the path 54.

It should be appreciated that the present invention can be adapted to deduct bonus values from the player if the player symbol 58 visits certain deduction locations (not shown). The game could visually or audibly reveal the nature of a deduction location to the player, possibly through a message 64. Alternatively, the game could conceal the nature of a deduction location.

In addition, the bonus scheme of the present invention can provide the player with additional lap bonus values for completing one or more laps through path 52. Each time a player completes a lap, the game could award a lap bonus value. This lap bonus value may or may not relate to the number of the lap, and the lap bonus value can be any amount.

The bonus scheme of the present invention incorporates a chase or pursuit concept, where a terminating symbol and player symbol repeatedly move throughout a bonus round. An opponent chases the player, and as long as the opponent does not catch the player, the player gains various bonus values while advancing along a path. When the opponent ultimately catches the player, the bonus round terminates. This type of bonus scheme provides gaming device players with a heightened level of excitement and entertainment.

Computer-Controlled Symbol Movement

Figure 8:
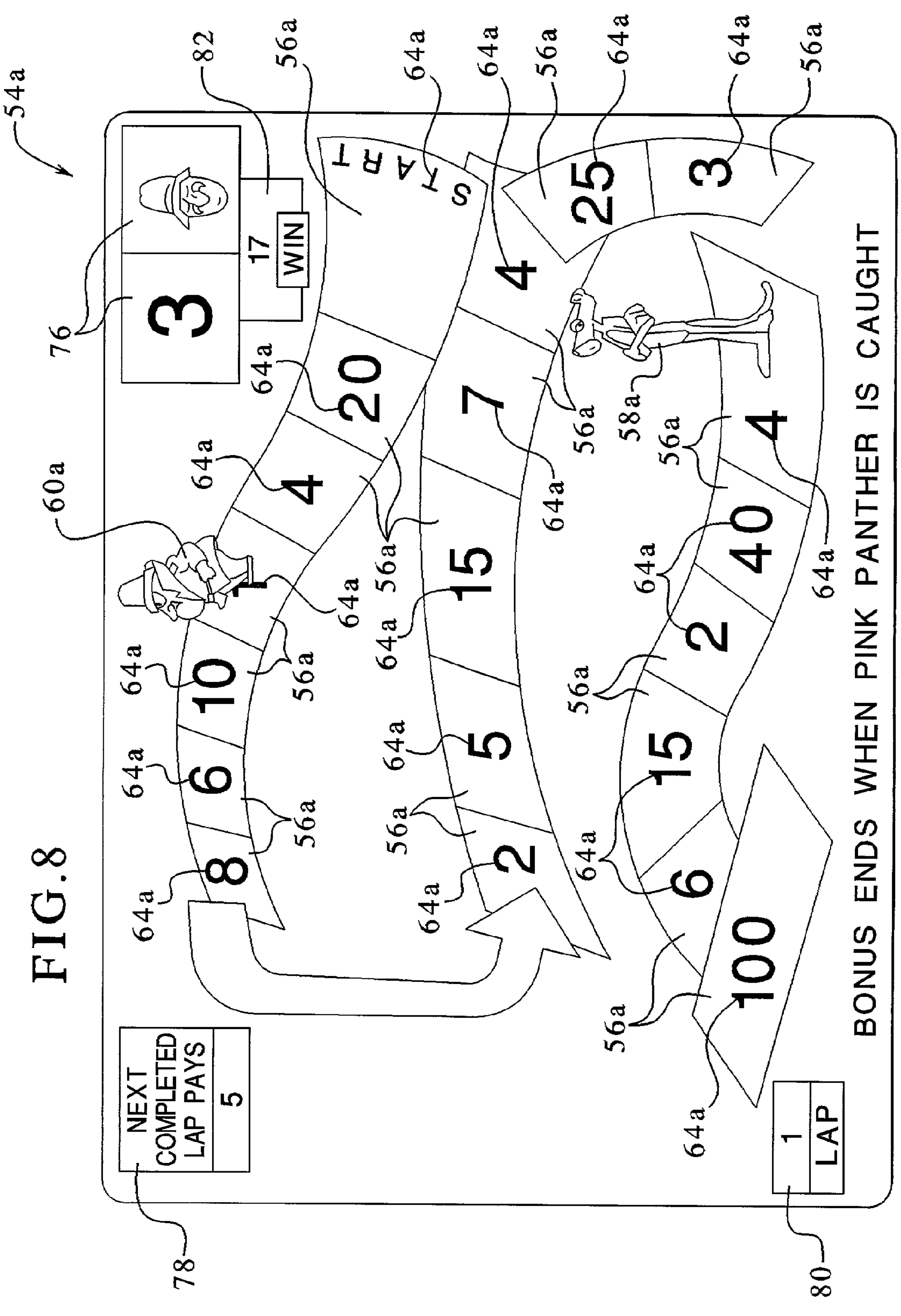
FIG. 8 is a top plan view of one path of the first embodiment of the present invention.

In a first embodiment of the present invention shown in FIG. 8, the bonus round begins by displaying the path 54*a,* locations 56*a* and player symbol 58*a* ahead of terminating symbol 60*a*. The computer also displays various indicators which provide information to the player, including a move indicator 76, a lap bonus indicator 78, a lap indicator 80 and a bonus indicator 82. Path 54*a* is preferably an obstacle course including an array of hazards along the path 54*a*. Locations 56*a* are identified by messages 64*a* which are numeric bonus values distributed along path 54*a*. Preferably, player symbol 58*a* is represented by a character, and terminating symbol 60*a* is represented by a different character.

Move indicator 76 displays the number of moves player symbol 58*a* will take and the number of moves terminating symbol 60*a* will take. Preferably move indicator 76 includes two video reels, one for each symbol, as show in FIG. 8. During the bonus round, the video reels rotate, come to a stop and then display a number. In this manner, the video reels simulate a random generation of moves for each symbol. Before the video reels rotate, preferably they display the face of the character associated with the symbols. The faces are replaced with numbers when the video reels stop rotating. Lap bonus indicator 78 displays a lap bonus value awarded to the player for certain laps which player symbol 58*a* completes without being caught. Lap indicator 80 displays the current number of the lap which the player symbol is taking through path 54*a*. Finally, bonus indicator 82 displays a running total of bonus values which the player accumulates during the bonus round.

Once the bonus round is triggered, the computer displays path 54*a* and player symbol 58*a* and terminating symbol 60*a,* both of which are preferably characters, as shown in FIG. 8. Preferably with one exception, throughout the entire bonus round of this first embodiment, the computer automatically causes the symbols to visit new locations. The exception comes at the beginning of the bonus round. Once the computer displays path 54*a* and the symbols, the player must use a play activator such as a play, action or move button or indicator to make the computer cause the symbols to visit new locations. It should be appreciated, however, that the computer could automatically cause visits when a bonus round is triggered without the player's input.

Preferably after receiving the player's input, the computer causes move indicator 76 to operate. Preferably, first the video reel which represents player symbol 58*a* rotates, comes to a stop and displays a number. Then player symbol 58*a* makes this number of moves and visits the appropriate location 56*a*. Next, preferably the video reel which represents terminating symbol 60*a* rotates, comes to stop and displays a number. Then terminating symbol 60*a* makes this number of moves and visits the appropriate location 56*a*.

The game will award the player with the bonus value displayed at the location 56*a* which is visited by player symbol 58*a*. Furthermore, if terminating symbol 60*a* does not catch player symbol 58*a*, the computer automatically causes move indicator 76 to operate again. This process continues until terminating symbol 60*a* catches player symbol 58*a*. All the while, the player will receive various bonus values for each location 56*a* which player symbol 58*a* visits and various lap bonus values for each lap which player symbol 58*a* completes.

When terminating symbol 60*a* eventually catches player symbol 58*a*, the bonus round terminates. Finally, as shown in FIG. 9, a winning screen 84 displays the total number of bonus credits which the player gained in the bonus round.

Figure 9:
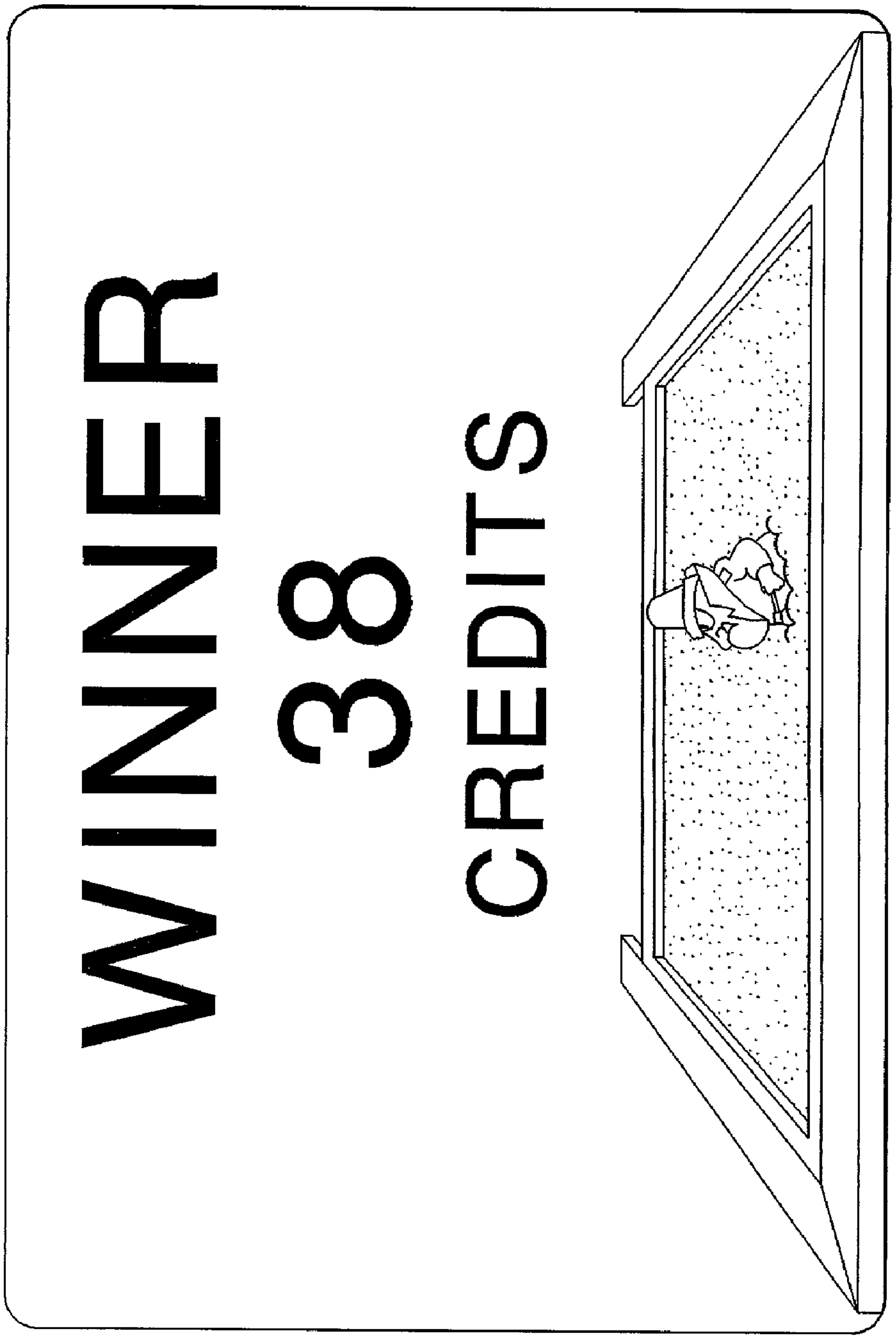
FIG. 9 is a top plan view of one path of the first embodiment of the present invention.

As is apparent in FIGS. 8 and 9, an embodiment of the present invention uses a cartoon theme. In addition, the embodiment can include audio features (i.e., sounds, songs, voices, and other sound effects) which are consistent with the cartoon theme.

Player-Controlled Symbol Movement

Figure 10:
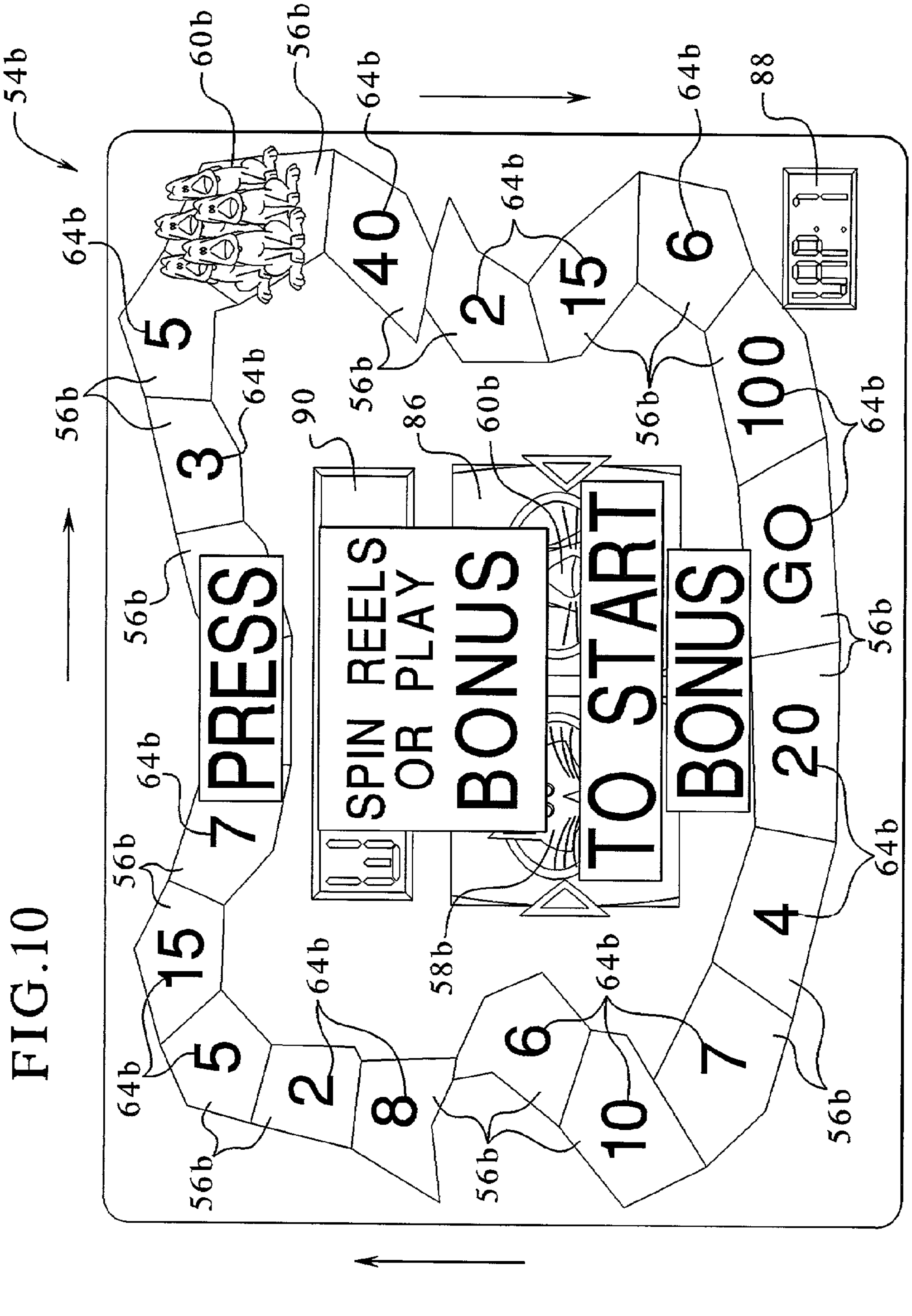
FIG. 10 is a top plan view of one path of the second embodiment of the present invention.

In a second preferred embodiment of the present invention, once the bonus round is triggered, the computer displays path 54*b*, locations 56*b* and player symbol 58*b* ahead of terminating symbol 60*b*, as shown in FIG. 10. Preferably, path 54*b* includes twenty-one locations 56*b*, and player symbol 58*b* begins six locations ahead of terminating symbol 60*b*. Furthermore, it is preferable that the starting location 56*b* of player symbol 58*b* bear the message 64*b*, "GO." Preferably, all other locations 56*b* bear a numeric bonus value as a message 64*b*. As shown in FIG. 10, preferably player symbol 58*b* is represented by a character, and terminating symbol 60*b* is represented by a different character.

Figure 11:
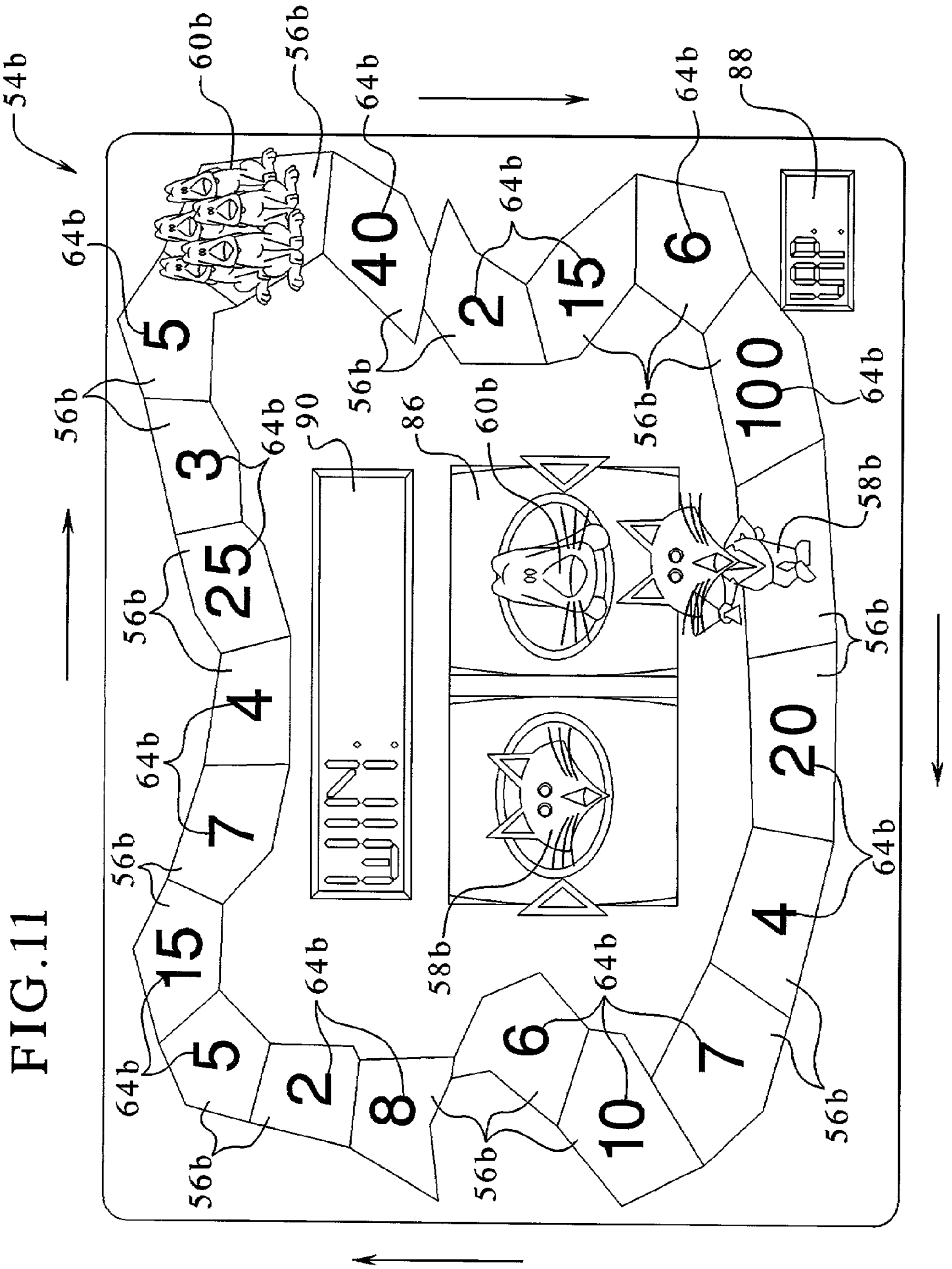
FIG. 11 is a top plan view of one path of the second embodiment of the present invention.

As shown in FIG. 11, the computer also displays a move indicator 86, a lap indicator 88 and a bonus indicator 90. Move indicator 86 displays the number of moves player symbol 58*b* will take and the number of moves terminating symbol 60*b* will take. Preferably, move indicator 86 includes two video reels, one for each symbol, as show in FIG. 11. When a bonus round begins, the video reels rotate, come to a stop and then display a number. In this manner, the video reels simulate a random generation of moves for each symbol. Before the video reels rotate, preferably they display the face of the character associated with the symbols. The faces are replaced with numbers when the video reels stop rotating. Lap indicator 88 displays the number of the lap which player symbol 58*b* is taking through path 54*b*. Also, bonus indicator 90 displays a running total of bonus values accumulated by a player during the bonus round.

After the computer displays path 54*b*, player symbol 58*b* and terminating symbol 60*b*, the player uses a play activator such as a play, action or move button or indicator to make the computer cause the symbols to visit new locations. After the player uses the play activator, the computer causes move indicator 86 to operate. Preferably, first the video reel which represents player symbol 58*b* rotates, comes to a stop and displays a number. Then player symbol 58*b* makes this number of moves and visits the appropriate location 56*b*. The number of moves which player symbol 58*b* can take is preferably a move from one to six, though it can be any move. Next, preferably the video reel which represents terminating symbol 60*b* rotates, comes to stop and displays a number. Then terminating symbol 60*b* makes this number of moves and visits the appropriate location 56*b*.

The game will then award the player with the bonus value displayed at the location 56*b* which player symbol 58*b* visited. If terminating symbol 60*b* did not catch player symbol 58*b*, the player must use the play activator again to continue the bonus round. Throughout the entire bonus round, the player must repeatedly use the play activator to make the computer cause the symbols to visit new locations 56*b*.

Each time the player symbol 58*b* visits any location, except for its starting location, the player receives a bonus value associated with that location 56*b*. Whenever player symbol 58*b* visits its starting location, the game awards the player with a visit to a new location 56*b*. This visit may be predetermined or the game can enable the player to select a location 56*b* to visit. In addition, the game awards the player with a lap bonus value for each lap which player symbol 58*b* completes without being caught.

Figure 12:
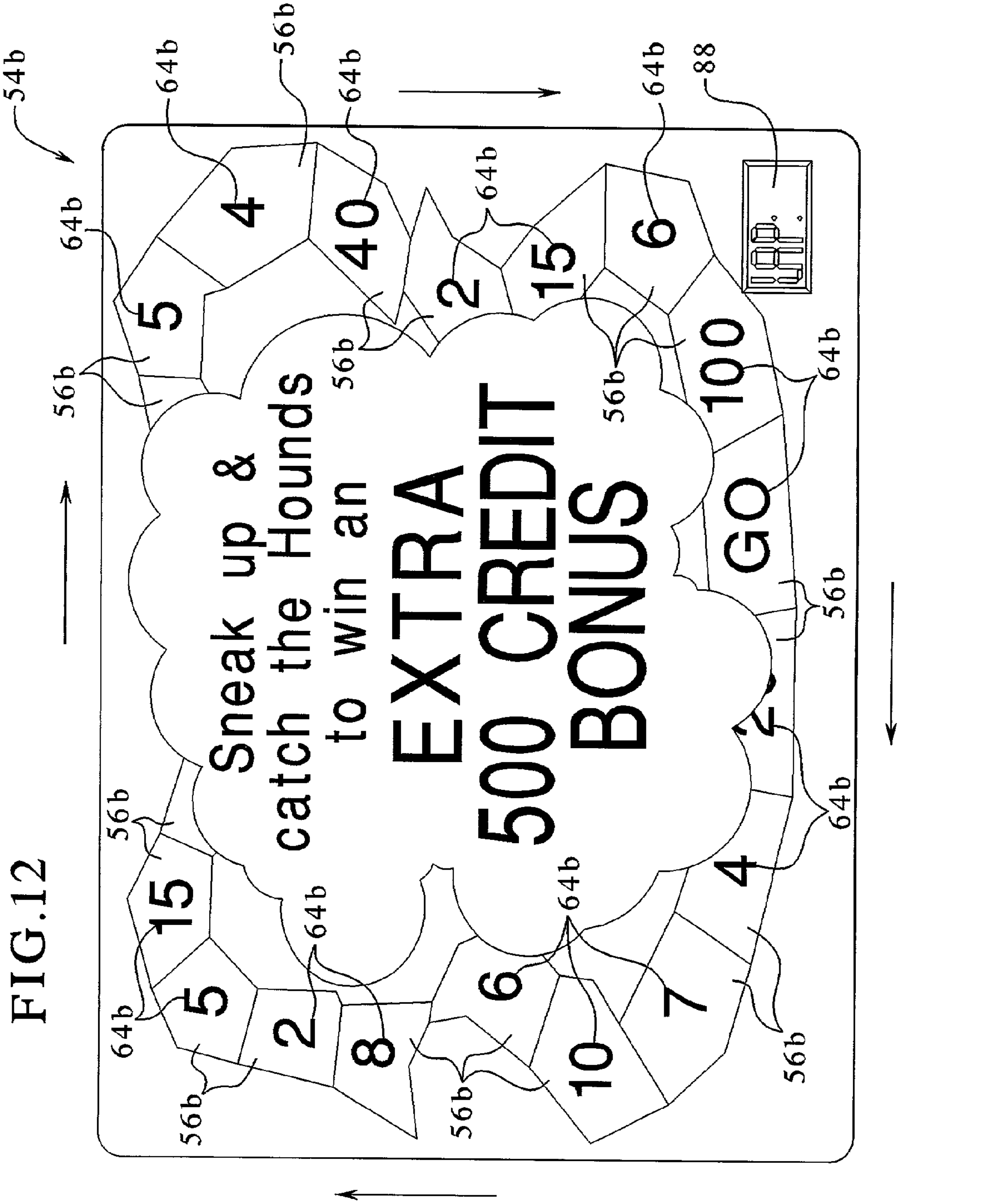
FIG. 12 is a top plan view of one path of the second embodiment of the present invention.

In this second embodiment of the present invention, it is possible for player symbol 58*b* to catch the terminating symbol 60*b*. If player symbol 58*b* makes substantially more movement along path 54*b* than terminating symbol 60*b*, player symbol 58*b* can catch terminating symbol 60*b*. If this occurs, the game may award the player with a bonus value (preferably, relatively high), as depicted in FIG. 12. Then the bonus round terminates.

Figure 13:
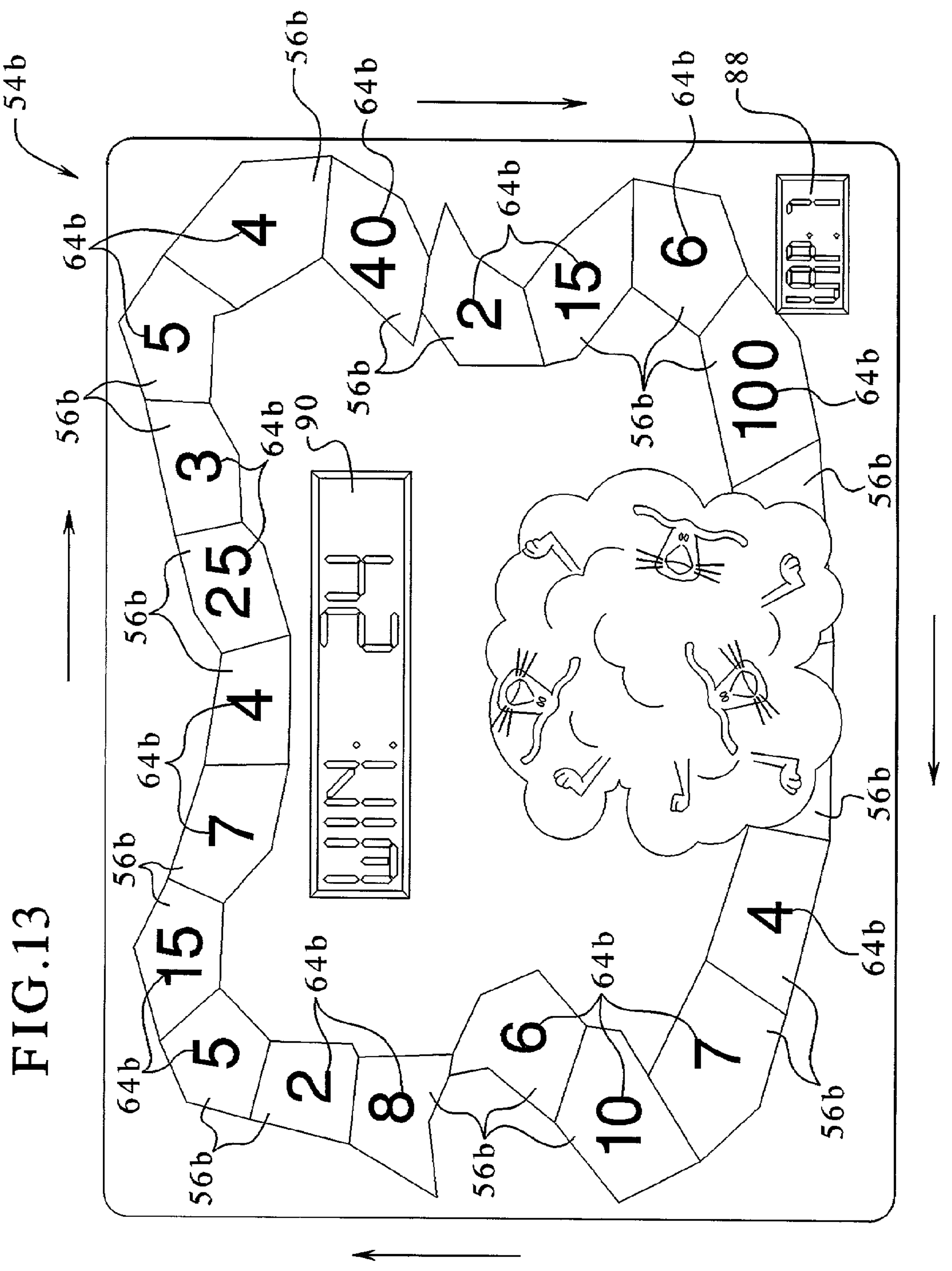
FIG. 13 is a top plan view of one path of the second embodiment of the present invention.

Taking into account this manner of terminating, there are preferably three manners in which the bonus round can terminate: (a) terminating symbol 60*b* catches player symbol 58*b*; (b) player symbol 58*b* completes a predetermined number of laps around path 54*b* (preferably, five laps); and (c) player symbol 58*b* catches terminating symbol 60*b*. In either of these events, the bonus round terminates, and the game awards bonus values to the player, as shown in bonus indicator 90 in FIG. 13. Finally, the game awards bonus credits gained by the player.

As is apparent in FIGS. 10 through 13, the second preferred embodiment incorporates a fox and hound cartoon theme. Preferably, the second preferred embodiment includes howling sounds made by the hounds each time the hounds fail to catch the fox. This preferred embodiment can include other audio features (i.e., sounds, songs, voices, and other sound effects) which are consistent with the fox and hound cartoon theme.

Thus, it should be appreciated that the present invention provides a bonus scheme which involves symbols which repeatedly change locations or move with respect to one another. The bonus scheme also gives awards and penalties associated with the respective locations of these symbols. Specifically, a terminating symbol repeatedly moves during a bonus round, and when the terminating symbol catches a player symbol, the bonus round terminates. Before the terminating symbol catches the player symbol, the player symbol advances along a path. While the player symbol advances without being caught, the player gains various awards, such as bonus values.

It should be appreciated that the present invention could include a button or other mechanism for enabling the player to select one or more locations or pick the location for movement of the character. In such an embodiment, the terminating symbol(s) could be determined or otherwise randomly generated based on the player's selection.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

What is claimed is:

1. A gaming device having a bonus game comprising:

a path including a plurality of locations;

a bonus value associated with at least one of the locations;

at least one player symbol;

at least one terminating symbol;

a display device which displays the path and the symbols to the player; and a processor, electronically connected to the display device, which is operable to: (a) cause the player symbol to visit at least one of the locations on the path, (b) display said player symbol visiting said location; (c) cause the terminating symbol to visit at least one of the locations on the path, (d) display said terminating symbol visiting said location; and (e) provide the player with any bonus value associated with the location visited by the player symbol.

2. The gaming device of claim 1, wherein the path is cyclical.

3. The gaming device of claim 1, wherein the bonus game terminates with the player symbol visits a location on the path which is identical to the location of the terminating symbol.

4. The gaming device of claim 1, wherein the bonus game terminates when the terminating symbol visits a location on the path which is identical to the location of the player symbol.

5. The gaming device of claim 1, wherein the bonus game terminates when the player symbol passes the terminating symbol on the path.

6. The gaming device of claim 1, wherein the bonus game terminates when the terminating symbol passes the player symbol on the path.

7. The gaming device of claim 1, wherein the processor causes the player symbol and terminating symbol to each sequentially visit a plurality of locations on the path.

8. The gaming device of claim 7, which includes a move indicator displayed by the display device.

9. The gaming device of claim 8, which includes a player input device electronically connected to the processor and the move indicator displays a number of moves after the player activates the player input.

10. The gaming device of claim 7, wherein the path includes a lap, and the display device included a lap indicator.

11. The gaming device of claim 10, wherein the player is awarded a lap bonus value each time the player symbol completes a lap of the path.

12. The gaming device of claim 7, which includes a bonus indicator displayed by the display device.

13. The gaming device of claim 1, which includes a play activator which communicates with the processor.

14. The gaming device of claim 1, wherein the bonus game terminates when the player symbol catches the terminating symbol.

15. The gaming device of claim 1, wherein the path includes a lap, and the bonus game terminates when the player symbol completes a predetermined number of laps along the path.

16. The gaming device of claim 15, which includes a lap bonus value.

17. The gaming device of claim 16, wherein the player is awarded a lap bonus value for each lap completed by the player symbol.

18. The gaming device of claim 17, which includes a move indicator displayed by the display device.

19. The gaming device of claim 18, which includes a lap indicator displayed by the display device.

20. The gaming device of claim 19, which includes a bonus indicator displayed by the display device.

21. The gaming device of claim 20, wherein the player symbol has a starting location on the path.

22. The gaming device of claim 21, wherein a sound is associated with a visit to at least one location.

23. A gaming device having a bonus game comprising:

a path including a plurality of locations;

an outcome associated with each of the locations;

at least one player symbol;

at least one terminating symbol;

a display device which displays the path and the symbols to a player; and a processor, electronically connected to the display device, which is operable to: (a) cause the player symbol to visit at least one of the locations on the path, (b) display said player symbol visiting said location; (c) cause the terminating symbol to visit at least one of the locations on the path, (d) display said terminating symbol visiting said location; and (e) provide the player with any outcome associated with the location visited by the player symbol.

24. The gaming device of claim 23, wherein a plurality of said outcomes are credits to a bonus award provided to the player.

25. The gaming device of claim 24, wherein at least one outcome is a deduction from a bonus award provided to the player.

26. A method for providing a bonus opportunity in a gaming device, said method comprising the steps of:

(a) triggering a bonus round;

(b) displaying a path including a plurality of locations;

(c) causing at least one player symbol to visit one of said plurality of locations;

(d) causing at least one terminating symbol to visit one of said plurality of locations;

(e) awarding a player any bonus value associated with a location visited by a player symbol; and (f) repeating steps (c) through (e) until the player symbol catches the terminating symbol or the terminating symbol catches the player symbol.

27. The method of claim 26, wherein the path is cyclical.

28. The method of claim 27, which includes awarding the player with a lap bonus value for each lap which the player symbol completes before the terminating symbol catches the player symbol.

29. The method of claim 27, which includes displaying a lap indicator.

30. The method of claim 26, which includes displaying a bonus indicator.

31. The method of claim 26, which includes terminating the bonus game when the player symbol visits the same location as the terminating symbol.

32. The method of claim 26, which includes terminating the bonus round when the player symbol completes a predetermined number of laps along the path.

33. The method of claim 26, which includes awarding a bonus value for each instance the player symbol passes a predetermined number of locations without being caught.

34. The method of claim 26, which includes displaying a move indicator.

35. The method of claim 33, which includes displaying a bonus indicator.

36. The method of claim 26, which includes making a sound after each visit which does not result in the terminating symbol catching the player symbol.

37. A method for providing a bonus opportunity in a gaming device, said method comprising the steps of:

(a) triggering a bonus round;

(b) displaying a plurality of locations;

(c) associating a terminating symbol with at least one of the locations;

(d) providing at least one potential award;

(e) moving said terminating symbol at least once during the bonus round; and (f) terminating the bonus round following a predetermined event.

38. The method of claim 37, which includes selecting a location and providing a player with an outcome associated with the location after the step of selecting a location.

39. The method of claim 38, which includes repeating steps of selecting a location and providing a player with an outcome, until a location associated with a terminating symbol is selected.

40. The method of claim 39, which includes moving said terminating symbol a plurality of times during the bonus round.

41. A method for providing a bonus opportunity in a gaming device, said method comprising the steps of:

(a) triggering a bonus round;

(b) displaying a plurality of symbols, including at least one terminating symbol;

(c) moving the terminating symbol at least once during the bonus round;

(d) providing at least one potential award; and (e) terminating the bonus round following a predetermined event.

42. The method of claim 41, which includes selecting a symbol and providing a player with an outcome associated with the symbol after the step of selecting a symbol.

43. The method of claim 42, which includes displaying a move indicator to the player displaying a number of moves the terminating symbol will move.

44. The method of claim 42, wherein said outcome is a bonus value award.

45. The method of claim 41, which includes moving said terminating symbol a plurality of times during the bonus round.

46. A gaming device having a bonus game comprising:

a path including a plurality of locations;

a first movable symbol displayed on one of the locations;

a second movable symbol displayed on one of the locations;

predetermined location changes associated with the first movable symbol and the second movable symbol;

a bonus value associated with at least one of the location changes;

a termination event associated with the first movable symbol and the second movable symbol being positioned at an identical location;

a processor; and a display device, electronically connected to the processor, which displays the path, the first movable symbol, and the second movable symbol to the player.

47. A gaming device having a bonus game comprising:

a memory device which stores data which represents a path, a plurality of locations included in the path, a first movable symbol and a second movable symbol; and a processor, electronically connected to the memory device, which is operable to:

(a) initiate a bonus round;

(b) change the location of the first movable symbol;

(c) display the changed location of the first movable symbol;

(d) change the location of the second movable symbol;

(e) display the changed location of the second movable symbol;

(f) provide a player with a bonus value after the movable symbol is positioned at least one predetermined location; and (g) terminate the bonus round after the first movable symbol and the second movable symbol are positioned at an identical location.

48. The gaming device of claim 47, wherein the processor provides the player with a bonus value after the first movable symbol and the second movable symbol are each positioned at a predetermined location.

49. The gaming device of claim 47, wherein the processor terminates the bonus round after one of the movable symbols passes the other movable symbol.

* * * * *